United States Patent [19]

Frister et al.

[11] Patent Number: 4,755,698
[45] Date of Patent: Jul. 5, 1988

[54] DYNAMO ELECTRIC MACHINE WITH LOW-NOISE OPERATING CHARACTERISTICS

[75] Inventors: Manfred Frister; Istvan Ragaly, both of Schwieberdingen, Fed. Rep. of Germany

[73] Assignee: Robert Bosch GmbH, Stuttgart, Fed. Rep. of Germany

[21] Appl. No.: 18,710

[22] Filed: Feb. 25, 1987

[30] Foreign Application Priority Data

Mar. 14, 1986 [DE] Fed. Rep. of Germany ....... 3608472

[51] Int. Cl.$^4$ ........................ H02K 3/493; H02K 5/24
[52] U.S. Cl. ........................................ 310/51; 29/596; 310/214
[58] Field of Search .................... 29/596; 310/51, 214, 310/186, 215, 216, 217, 218

[56] References Cited

U.S. PATENT DOCUMENTS 2,235,903  3/1941  Schönfelder ........................ 310/51

FOREIGN PATENT DOCUMENTS

| 502461 | 5/1954 | Canada | 310/214 |
| 644855 | 5/1937 | Fed. Rep. of Germany | 310/214 |
| 677781 | 7/1939 | Fed. Rep. of Germany | 310/214 |
| 5220204 | 2/1977 | Japan | 310/216 |
| 12792 | 6/1905 | United Kingdom | 310/216 |

Primary Examiner—Patrick H. Salce
Assistant Examiner—D. L. Rebsch
Attorney, Agent, or Firm—Frishauf, Holtz, Goodman & Woodward

[57] ABSTRACT

Operating noise of a dynamo electric machine, and particularly a three-phase vehicular-type alternator, can be reduced by changing the reluctance or permeability of the magnetic path between rotor and stator of adjacent stator teeth by splitting the stator teeth to introduce additional radially extending gaps in the stator teeth or by distributing, non-uniformly or uniformly, ferromagnetic slot closers about the circumference of the stator slots while leaving, adjacent a stator slot with a magnetic closer, open stator slots or slots covered only with non-magnetic slot cover elements, such as treated paper, cardboard, or the like. This changes the frequency of attraction between rotor and stator to a frequency range which is not humanly perceptible or annoying, for example falling below the frequency range at which the alternator can operate, for example below idling speed of an internal combustion engine driving the alternator, or towards a frequency range so high that the operating noise level of the internal combustion engine masks any generator noise.

15 Claims, 6 Drawing Sheets

DYNAMO ELECTRIC MACHINE WITH LOW-NOISE OPERATING CHARACTERISTICS

The present invention relates to dynamo electric machines, and more particularly to vehicular-type alternators, and especially three-phase automotive alternators. The invention is concerned with reducing operating noise of such machines, and with a method to manufacture machine components efficiently and inexpensively so that, when made, the machines will achieve low-noise characteristics.

BACKGROUND

It is well known that three-phase generators cause operating noise which arises due to changes in the reluctance of the magnetic circuit as the rotor operates, in the region of the transition between stator to rotor. Looked at from another point of view, the permeability—which is the reciprocal of reluctance—of the path which includes the stator and the rotating rotor changes. It has previously been proposed to introduce ferromagnetic slot closers within the slots formed in the stator. The stator slots usually are radially directed slots in which the stator windings are introduced. Ferromagnetic slot closers have been used to reduce the magnetic reluctance, and thus reduce the effect of changing forces, and their amplitudes, which arise between the stator and the rotor in operation of the machine. Placing ferromagnetic slot closers in all the slots of a stator thus permits some extent of reduction of noise; its has been found, however, that the overall reduction which can be effected thereby is not sufficient for low-noise operation of the machine, due to noise which still arises based on changes in the reluctance or permeability of the magnetic circuit.

THE INVENTION

It is an object to improve alternator operation by reducing the noise level which is due to magnetic interaction of the rotor and the stator.

Briefly, the magnetic properties of the stator are changed in the region adjacent the air gap by changing the magnetic surface facing the rotor in the vicinity of the teeth formed by the stator between the rotor slots, so that the frequency of vibrations, when the alternator is operating, falls within an acoustic range outside of human perception of noise. Thus, upon rotation of the rotor with respect to the stator, recurring change of magnetic attraction between the rotor and the stator teeth will result in vibration which have a frequency outside of a humanly perceptible frequency range which is annoying. The frequency of vibrations, of course, is determined by the rotational speed of the dynamo electric machine and the number of the teeth. This speed, in a vehicular alternator, varies widely.

In accordance with a feature of the invention, the magnetic properties of the stator in the region adjacent of the air gap can be changed by deforming the shape of the opening slots or by introducing ferromagnetic slot closers in selected slots, for example circumferentially so placed that, in operation of the machine, the number of changes in the reluctance or permeability, per unit time, is so altered that the resulting vibrations of parts of the alternator are shifted into frequency ranges which are no longer disturbing or annoying.

In accordance with a feature of the invention, the end regions of the stator teeth can be, selectively, split and deformed and peened over the ends of the slots to provide for a non-uniform or otherwise disturbed magnetic field and flux distribution as the rotor rotates, to thereby change the frequency of vibrations which occur due to magnetic effects arising in the air gap between the rotor and stator. One such effect, for example, is magnetic attraction of the rotor to the stator.

The method and system are based on the discovery that effective change of noise level of alternators can be obtained when the changes in reluctance are shifted in its frequency range to such regions in which, at the various operating states of the alternator, a noise level will arise which is no longer humanly perceptible, and hence not annoying. This is done rather than the previous attempt to decrease the amplitude of noise level alone. The changes in reluctance occur, of course, only under dynamic conditions, that is, in the respective speed ranges of the alternator which occur during operation when installed, for example, in an automotive vehicle. Noise which would be generated by the alternator when it operates at a speed below idling speed of a vehicular internal combustion engine (ICE) driving the alternator is not annoying since, of course, in operation the ICE will operate at, or above idling speed. At very high speeds of the ICE, the noise generation from the alternator itself is not annoying either. At high speeds of the ICE, the overall noise level of operation of the ICE, windage and tire noises and the like are such that additional noise due to the alternator is hardly perceived, and not specifically perceived as annoying.

The noise generation of an alternator is particularly annoying when portions of the alternator, caused by periodic changes in reluctance path, resonate at a resonance frequency due to mechanical coupling. Based on such resonance effects, additional oscillations of alternator components may arise, so that vibrations and oscillations, which generate noise, may occur which go far beyond the noise level which can be expected, absent such resonance phenomena. In accordance with a feature of the invention, the triggering frequencies of oscillations—which may cause other elements to oscillate due to resonance effects—are shifted into frequency ranges which do not cause parts and components of the alternator to resonate. This is a far more effective solution to decreasing the noise level than merely to decrease the amplitude of radiated noise.

In accordance with a feature of the invention, the shift in triggering or stimulating frequencies can be obtained simply and inexpensively and without substantial additional assembly costs. In accordance with a preferred feature of the invention, the stimulating frequencies can be changed in their frequency range by placing, regularly or irregularly or at random, iron slot closers, or wedges in stator grooves and leaving some of the stator grooves free of ferromagnetic closers, or wedges. This disturbs the periodic occurrence of changes in magnetic reluctance and thus disturbs and suppresses the generation of oscillations which might result in resonance effects. In accordance with another feature of the invention, a shift of triggering or stimulating frequency can be obtained by plastically deforming the shape of the stator teeth which are located between the slots at the region facing the inner surface of the stator. In one embodiment, the teeth may be split radially to form at least one or two additionally air gaps which cause additional changes in reluctance or permeability of the magnetic circuit, thereby shifting the stimulating frequencies within higher frequency ranges.

DETAILED DESCRIPTION

Referring first to FIGS. 1-5 which, generally, illustrate a stator 10 having stator slots 12 which are punched out from the stator laminations, leaving stator teeth 11 between the stator slots. The general form of the stator teeth is well known, having end leg portions which form pole shoes facing the rotor air gap, as well known and as used in many standard structures. The rotor is shown only schematically at 13, operating within a central opening or bore 14 of the stator and separated from the stator by a suitable air gap, as well known. For simplicity, the windings in the stator slots are shown only schematically at W.

In accordance with the present invention, the noise level of a three-phase alternator can be improved by influencing not only the amplitude of changes in magnetic permeability of the magnetic path between the stator and the rotor but, highly effectively, by shifting the stimulation frequency.

Figure 1:
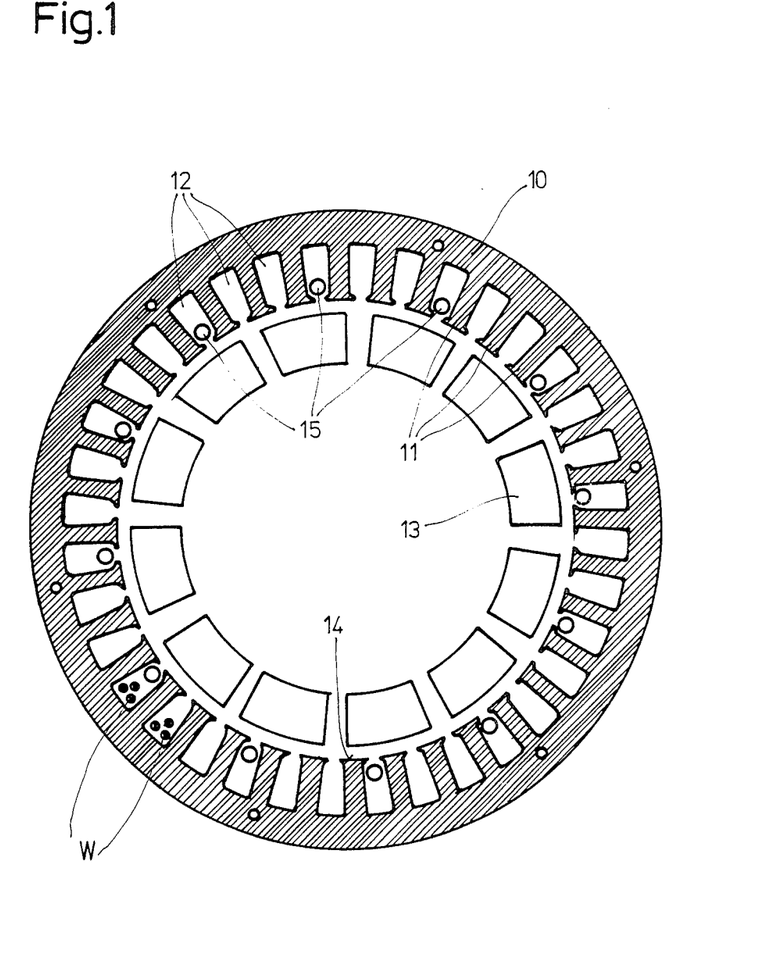
FIG. 1 is a plan view of a stator, in axial cross section in which a top view of a stator lamella is visible, shown only schematically, and illustrating one possible distribution of ferromagnetic slot closers in the stator.

In the accordance with the embodiment shown in FIG. 1, ferromagnetic stator closers, or wedges 15 are introduced in some of the stator slots, but not all; some of the stator slots are left free, that is, not retaining any ferromagnetic slot closers. The distribution of the ferromagnetic slot closers 15 may be regularly or periodically recurring about the circumference of the stator; or it may be irregular or at random with more or less free stator slots between those slots which have ferromagnetic closer elements 15 inserted therein.

In the embodiment illustrated in FIG. 1, twelve ferromagnetic slot closers 15 are uniformly distributed over the circumference in such a manner that any slot which is closed by a slot closer 15 is separated in either direction by two stator slots 12 without ferromagnetic closer elements 15 until another "closed" slot occurs. Thus, the sequence is one "closed" slot, two open slots, a closed slot, two open slots, etc.

Of course, the "open" slots may well have covers or closers of non-magnetic material placed thereon, typically resin-impregnated cardboard, paper or the like, that is, have stator slot closers supplied. FIG. 1 does not illustrate such non-magnetic closers since they are well known in the art and do not substantially change the magnetic flux distribution or circuit.

Figure 2:
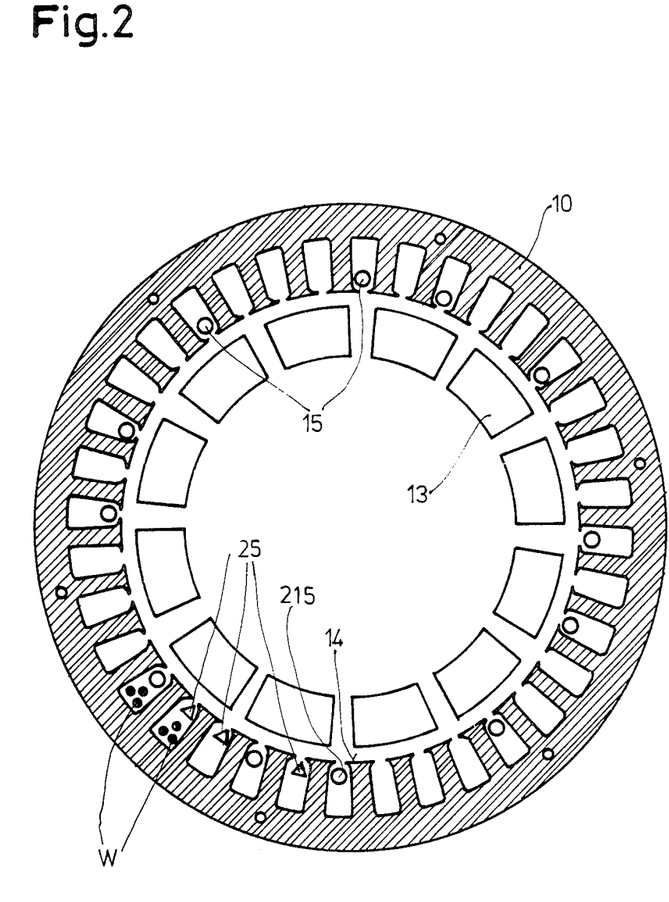
FIGS. 2, 3, 4 and 5 illustrate other arrangements of distribution of ferromagnetic and stator slot wedges, closers, as well as non magnetic slot closers in the slots of a stator generally shown in FIG. 2 in which the ferromagnetic closers are shown as circles and non magnetic closer elements as triangles.

Embodiment of FIG. 2: The ferromagnetic slot closers 15 are distributed over the inner circumference. As FIG. 2 clearly shows, various arrangements are possible, for example, random placement or placement in which, sequentially, and starting clockwise from magnetic closer 215, first one, then two, then three slots are left blank or empty at the end. "Empty" in this case refers to absence of ferromagnetic closers of course, the slots can be closed by closer elements of resin-soaked paper, insulating board or the like. The pattern then repeats itself with the ferromagnetic first slot closer 15 at the "9 o'clock position" and so on, circumferentially around the stator.

The various examples shown in the drawings should not be considered as limiting the embodiments. Various possible distribution patterns of slot closers of ferromagnetic properties are shown. The drawings merely illustrate that the spacing between ferromagnetically closed slots and ferromagnetically open slots may vary—regularly or irregularly—with free or ferromagnetically open slots occurring in different distributions.

The irregular distribution of ferromagnetic slot closers in the slots causes substantial deterioration of the periodicity in variation of the magnetic reluctance—or permeability—of the magnetic path or circuit which includes the stator. Thus, an effective arrangement is provided to suppress stimulation of oscillations in the stator and, of course, further transmission to other alternator components. FIG. 2 illustrates, schematically, non-magnetic slot closer elements 25 in the first three non-magnetically closed slots following the ferromagnetic closer 215. The remaining slots may likewise be covered by such non-magnetic slot closer elements, for example insulation board, resin-coated cardboard or paper or the like; remaining slot closers and closer elements have been omitted from the drawing for clarity. These non-magnetic closer elements in the form of strips, are placed in those slots which do not carry the magnetic closers 15, 215. Not all the slots need be covered by the non-magnetic slot closer elements or inserts covers 25 in order to prevent oscillations arising due to surface or windage effects. Thus, the arrangement and distribution of magnetic slot closers 15, 215 and non-magnetic slot closer elements or covers 25 can be regularly or irregularly distributed over the circumference of the opening of the stator.

Figure 3:
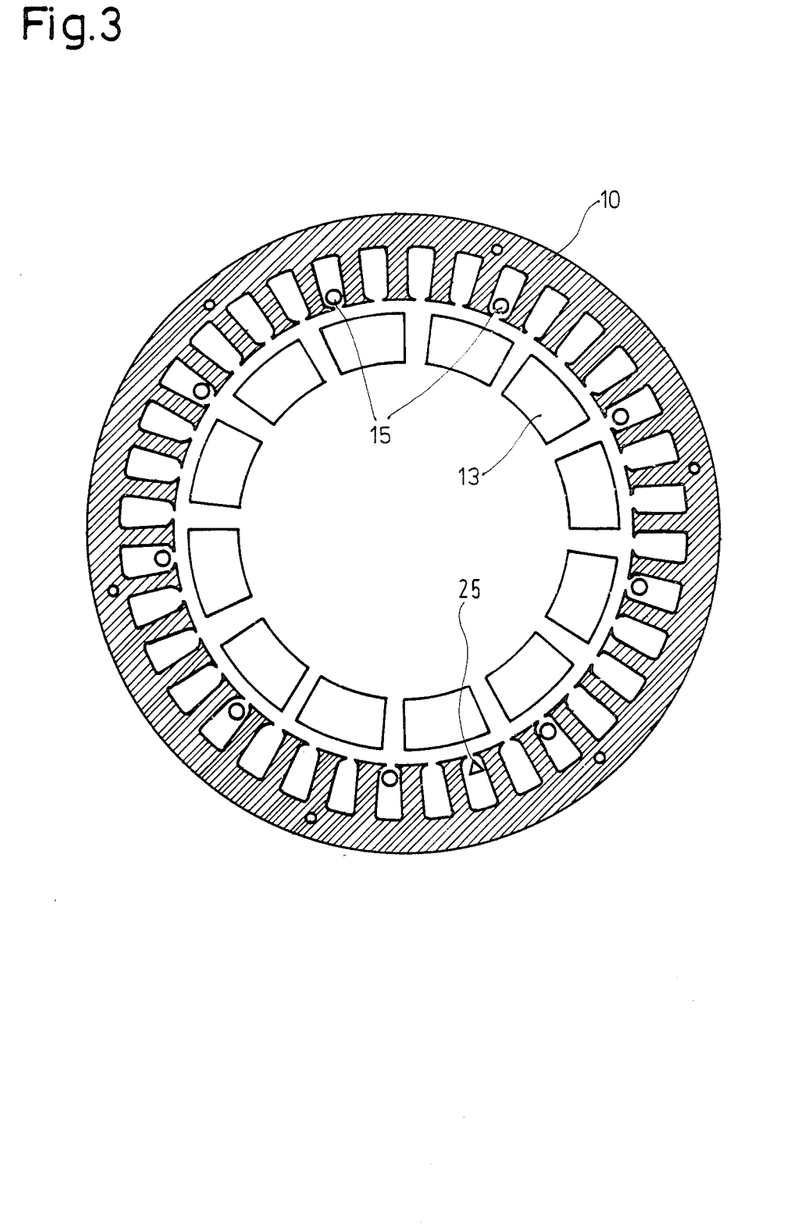

Embodiment of FIG. 3: Nine (9) ferromagnetic slot closers are uniformly distributed over the circumference of the stator; the distribution of the ferromagnetic slot closers 15 is uniform, that is, any slot which is closed by a ferromagnetic closer 15 is bounded on either side by three slots which do not have ferromagnetic slot closers inserted. All or some of them may have non-magnetic closer elements or insert strips 25 therein, only one of which is shown in FIG. 3 by way of example.

Figure 4:
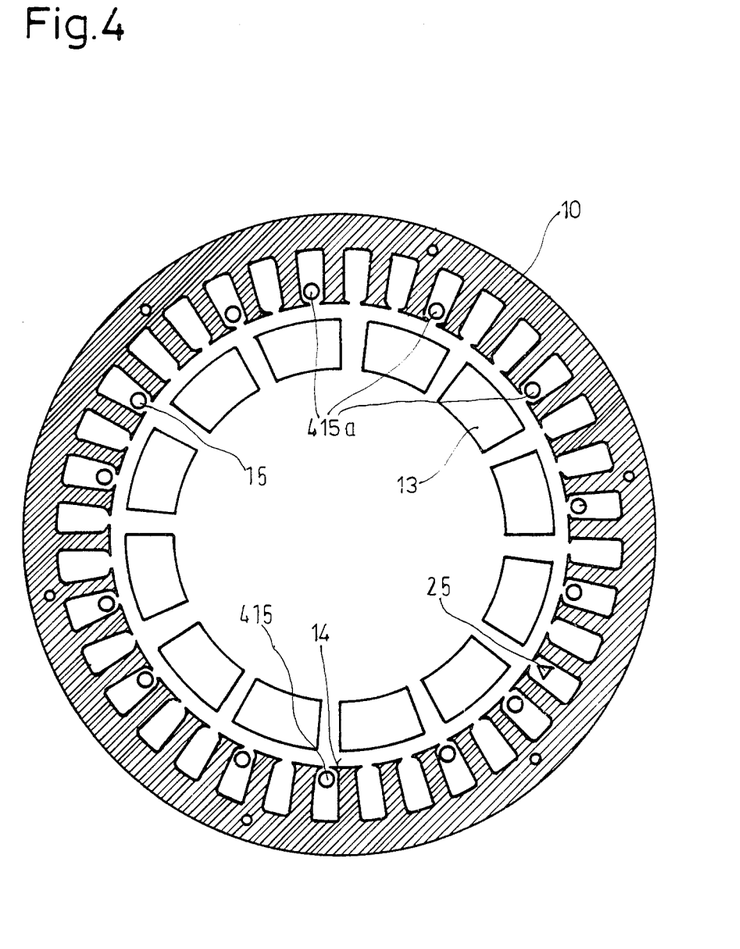

Embodiment of FIG. 4: Fourteen (14) ferromagnetic closers 15 are distributed about the circumference in a pattern in which, starting clockwise from closer 415, first one, then two, and then one more non-ferromagnetically closed slots are placed adjacent the ferromagnetically closed slots. Since the stator, in the example shown, has 36 slots, the distribution cannot be entirely uniform. Slots 415a interrupt the previously mentioned pattern. Two ferromagnetically open slots are placed between the slots 415a. The distribution about the circumference of the ferromagnetic closers 415a is irregular and the spacing of slots which do not have ferromagnetic closers therein can be selected, as shown by the example, in any suitable manner. Non-magnetic closer elements 25 can be placed in any one or all of the slots not having the closers 15, 415 therein, as shown only in one slot, for purposes of illustration.

Figure 5:
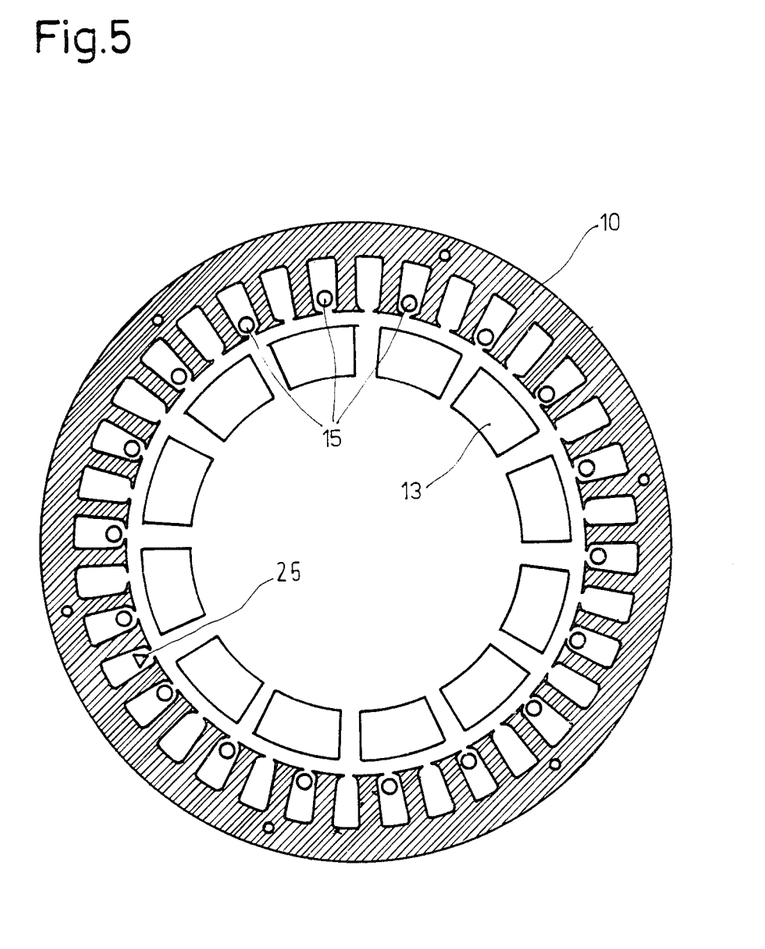

Embodiment of FIG. 5: The thirty-six (36) slots of the stator 10 have eighteen ferromagnetic slot closers 15 located therein, uniformly distributed about the circumference of the stator. The stator slots which are closed by the ferromagnetic slot closers 15 alternate with stator slots which do not have the ferromagnetic closers 15 therein. Again, some of the slots which do not have ferromagnetic closers therein may be closed by non-magnetic closer elements, one of which is shown at 25. Not all of them need be closed, however, for example eleven of the slots adjacent the ferromagnetically closed slots may be so closed—selected at random or in a recurring pattern, as desired.

Recurring oscillations or vibrations as a rotor operates in the air gap of a stator in which either all the stator slots have slot closers 15 inserted therein or none of them have any magnetic slot closers 15 inserted, can also be changed with respect to frequency by deforming the pole shoes formed by the teeth 11 which separate the slots 12.

Figure 6:
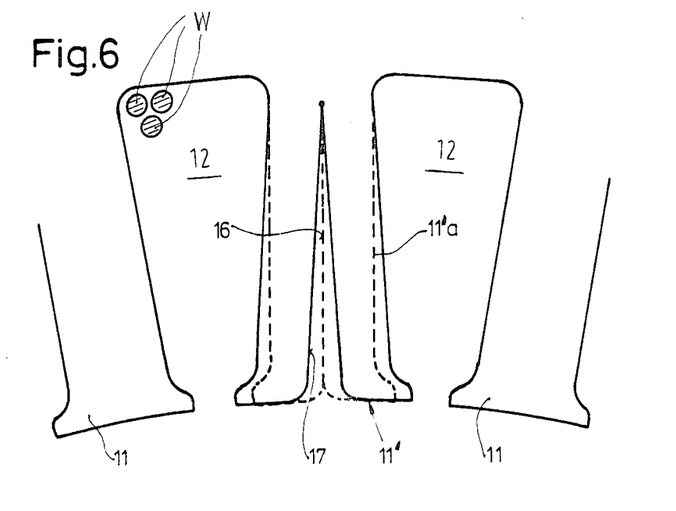
FIG. 6 is an enlarged axial view of stator teeth, and illustrating one form of possible deformation.
Figure 7:
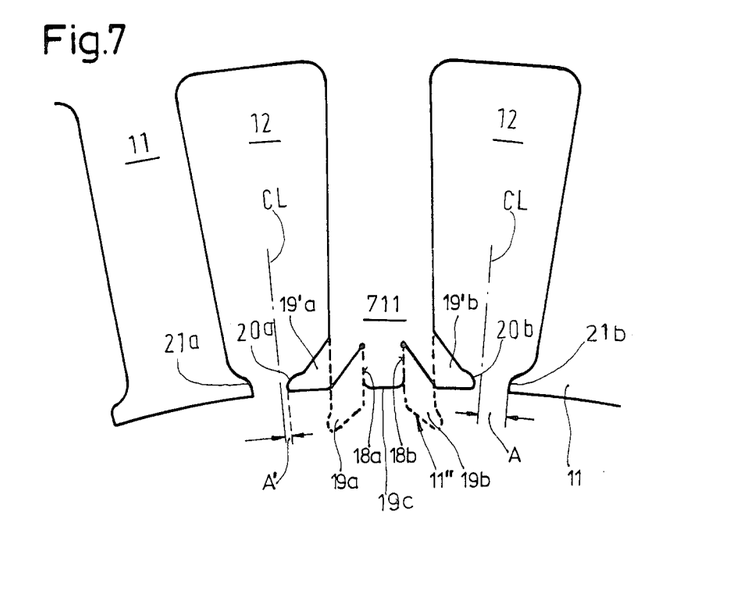
FIG. 7 is a view similar to FIG. 6 and illustrates another possible view of deformation of stator slot openings by plastic deformation of the stator teeth.

FIGS. 6 and 7 show two examples, to a greatly enlarged scale, of portions of a stator in which the teeth 11 between the slots are deformed; this deformation may extend—see FIG. 6—close to the bottom of the slots or be confined essentially to the pole shoes or the region of the teeth adjacent the air gap (FIG. 7).

Embodiment of FIG. 6: Before inserting the coils into the stator stack, and before packaging of the lamellae which form the stator stack, some or all of the lamellae, in predetermined regular or irregular distribution about the circumference are slotted, as seen at 16. Thus, some of the teeth 11 are deformed to form teeth 11' by forming a center slit 16 therein. The distribution of the teeth 11 which are thus modified to form the teeth 11' about the circumference may be regular or at random and, for example, may be in accordance with any one of the patterns described in connection with FIGS. 1-5; or entirely at random.

After slitting some or all of the teeth 11 to provide for teeth 11' by forming the slits 16, the teeth are left in the normal shape, shown in broken lines in FIG. 6. In manufacture, as the next step, the stator windings are inserted in the slots. After introduction of the stator windings—suitably insulated and, for example, also insulated from the core lamellae by a slot sleeve or jacket, a suitable wedge element is introduced into the slit 16 to deform the teeth 11 to assume the shape shown in full line at 11', by wedging apart the teeth portion previously in the position shown at broken line 11a to the position shown in full line at 11' in FIG. 6. The halves, which originally were merely slit at 16, thus, by automatic or manual introduction of a wedge element or similar tool, are plastically deformed for mutual opening. This will result in a narrowing of the slot openings between an undeformed tooth 11 and a deformed tooth 11', and an additional air gap as shown at 17. In operation, and as the rotor operates in the air gap of the stator, additional changes in reluctance or permeability of the magnetic path or circuit will occur, so that any stimulating frequencies are substantially raised, that is, stimulating frequencies are shifted in a higher frequency range than would occur if the rotor operates in an undeformed stator of the prior art.

Embodiment of FIG. 7: The basic principle is similar to that illustrated in FIG. 6, in that the distribution and shape of the pole shoes is changed by plastic deformation. As in the embodiment of FIG. 6, the plastic deformation is carried out after the stator winding has been inserted.

Initially, the stator stack is formed with lamellae in which selected teeth—or all teeth—are constructed with pole-shoe portions as shown at 11'' in FIG. 7. The pole shoe is formed with slits 18a, 18b, and—looked at from the axis of the rotor—inward extensions 19a, 19b are formed on the selected teeth 11''. The width of the respective teeth 11, 11'' will be the same. Thereafter, the stator winding is inserted in the respective slots 12 and then, in accordance with a feature of the invention, the pole shoe portions 19a, 19b are bent into the full-line position shown at 19'a, 19'b, thus resulting in the final tooth 711, which has an inwardly deflected pole shoe 19'a, a central portion 19c and a further deflected pole-shoe portion 19'b. The result will be that, circumferentially around the stator opening, stator teeth 11 which are not deformed can be placed adjacent deformed teeth 711, so that a uniform oscillatory or periodically occurring change in the reluctance of the magnetic path or circuit will be prevented, and the frequency of change of such reluctance path will be substantially increased over the increase over that of a non-deformed stator of the prior art. The wedge-shaped deformation of the pole shoe portions 19'a, 19'b results in two additional air gap regions which, as can be seen immediately, results in tripling of any stimulation frequency in the region of the tooth 711. The construction of the respective stator teeth before deformation is so done that the deformation can be carried out after the windings have been inserted in such a manner that no further work steps are necessary other than bending over the pole-shoe portions 19'a, 19'b. The arrangement has substantial advantages not only from an operating point of view but also from a manufacturing point of view. For winding, the opening of the slots remains the normal slot opening twice the dimension A shown in FIG. 7. After deformation, and after insertion of the slot windings W in normal form, the tips 20a, 20b of the deformed pole shoes 19'a, 19b will be spaced from the center line CL of the slots 12 by the distance A'; whereas the tips 21a, 21b of the pole shoes from the undeformed teeth 11 will be spaced from the center line CL of the slot by the distance A. The spacing of the center portion 19c from the deformed pole shoes 19'a, 19'b introduces a radially non-uniform air gap which further detracts from generation of uniform oscillations upon rotation of a rotor in the air gap of the alternator. Preferably, the pole shoes 19'a, 19'b are so deformed that the spacing A' is substantially less than the spacing A, as seen in FIG. 7, preferably less than 25% and down to only about 10%, for example.

Various changes and modifications may be made, and features described in connection in any one of the embodiments may be used with any of the others; thus, ferromagnetic slot closers 15 may be used in slots adjacent the slots defined between slit teeth 11' (FIG. 6) or deformed teeth 711 (FIG. 7), or in those slots; non-magnetic slot closer elements may be used anywhere where desired.

The distribution of non-magnetic slot closer elements 25, magnetic slot closers 15, and their use alone or in combination with deformed teeth as shown in FIGS. 6 and 7 can be readily determined from design parameters relating the number of slots, diameter of the machine, and stimulating frequencies causing noise generation, which are to be shifted into different, non-annoying frequency ranges.

We claim:

1. Low operating noise three-phase alternator, having a stator formed of a stack of laminations defining a theoretical cylindrical surface;

a rotor rotating adjacent said theoretical cylindrical surface while leaving an air gap therebetween;

stator winding slots (12) radially extending from said theoretical cylindrical surface, distributed about the circumference thereof, said slots defining stator teeth (11) between adjacent slots;

and stator winding means (W) in said stator winding slots, comprising, in accordance with the invention, an arrangement for shifting vibrations, occurring upon rotation of the rotor with respect to the stator due to change of magnetic attraction between the rotor and the stator and change of the magnetic reluctance or permeability, into an accoustic range outside of humanly perceptive noise, wherein at least some of said stator teeth (11') are radially slit to define slit teeth portions (11'), said slit teeth portions being wedged apart and circumferentially deformed in opposite directions towards the slot immediately adjacent the slit teeth portions to provide for additional, radially extending non-magnetic gaps (17) between said teeth portions.

2. The alternator of claim 1, wherein two slits are formed in the stator teeth, extending partially throughout the length of the respective teeth and defining three tooth end portions (19a, 19c, 19b) adjacent said air gap;

and wherein two of said end portions (19a, 19b), positioned adjacent neighboring slots (12), are deformed and bent laterally towards said slots to define, between said tooth end portions, a slot end gap (A+A') at the end of the slot, and a small gap between said deformed tooth end portions and the adjacent tooth end portion (19c).

3. Low operating noise three-phase alternator, having a stator formed of a stack of laminations defining a theoretical cylindrical surface;

a rotor rotating adjacent said theoretical cylindrical surface while leaving an air gap therebetween;

at least six stator winding slots (12) radially extending from said theoretical cylindrical surface, distributed about the circumference thereof, said slots defining stator teeth (11) between adjacent slots;

stator winding means (W) in said stator winding slots, and comprising, in accordance with the invention, at least two ferromagnetic slot closers (15) closing off at least two of said slots adjacent the air gap, said at least two slot closers being positioned relative to each other to leave at least one slot (12) free between slots having said ferromagnetic slot closers.

4. The alternator of claim 3, wherein (FIG. 1), uniformly distributed about the circumference of said theoretical cylindrical surface, slot closers are inserted in slots (12) leaving, adjacent any one slot with a slot closer, two slots without slot closers.

5. The machine of claim 3, wherein (FIG. 2), uniformly distributed about the circumference of said theoretical cylindrical surface, slot closers are inserted leaving one and three slots adjacent a slot closer, free from slot closers.

6. The machine of claim 5, further including non-magnetic slot closer elements (25) closing off the slots with respect to said air gap which are free from ferromagnetic slot closers (15).

7. The machine of claim 3, wherein (FIG. 3), uniformly distributed about the circumference of said theoretical cylindrical surface, ferromagnetic slot closers (15) are placed in selected slots leaving three slots (12) without ferromagnetic slot closers between those slots having ferromagnetic slot closers (15) placed adjacent said air gap.

8. The machine of claim 7, further including non-magnetic slot closer elements (25) located in the second or center one of said three slots positioned between those neighboring slots which have ferromagnetic slot closers (15) included therein.

9. The machine of claim 3, wherein (FIG. 4) the distribution of slot closers (15) located in slots is irregular, in accordance with a pattern:

a slot (12) with a ferromagnetic slot closer (15);

a first adjacent slot (12) without a ferromagnetic slot closer;

a second adjacent slot with a second ferromagnetic slot closer (15); and third, and fourth slots without ferromagnetic slot closers therein;

said pattern repeating, except for odd slots essentially unchanged about the circumference of the stator.

10. The machine of claim 9 further including non-magnetic slot closer elements (25) located in at least some of the slots which do not have ferromagnetic slot closers placed therein.

11. The machine of claim 3, wherein (FIG. 5) said ferromagnetic slot closers (15) are placed in alternate slots, uniformly distributed about said theoretical cylindrical surface.

12. The machine of claim 11, further including non-magnetic slot closer elements (25) located in at least some of the slots which do not have ferromagnetic slot closers (15) placed therein.

13. The machine of claim 3, wherein thirty-six slots (12) are formed in the stator;

and wherein the number of ferromagnetic slot closers is 36: n, wherein n is an integer consisting of 2, 3 or 4.

14. The machine of claim 3, wherein (FIG. 4) thirty-six slots (12) are formed in the stator;

and wherein fourteen ferromagnetic slot closers (15) are located in selected slots, with irregular numbers of slots adjacent the slots having said ferromagnetic closers inserted therein, including between one and three slots without said ferromagnetic closers.

15. The machine of claim 14, further including eight non-magnetic slot closer elements (25) located in selected ones of said slots free from ferromagnetic slot closers (15).

* * * * *